United States Patent Office 3,117,073
Patented Jan. 7, 1964

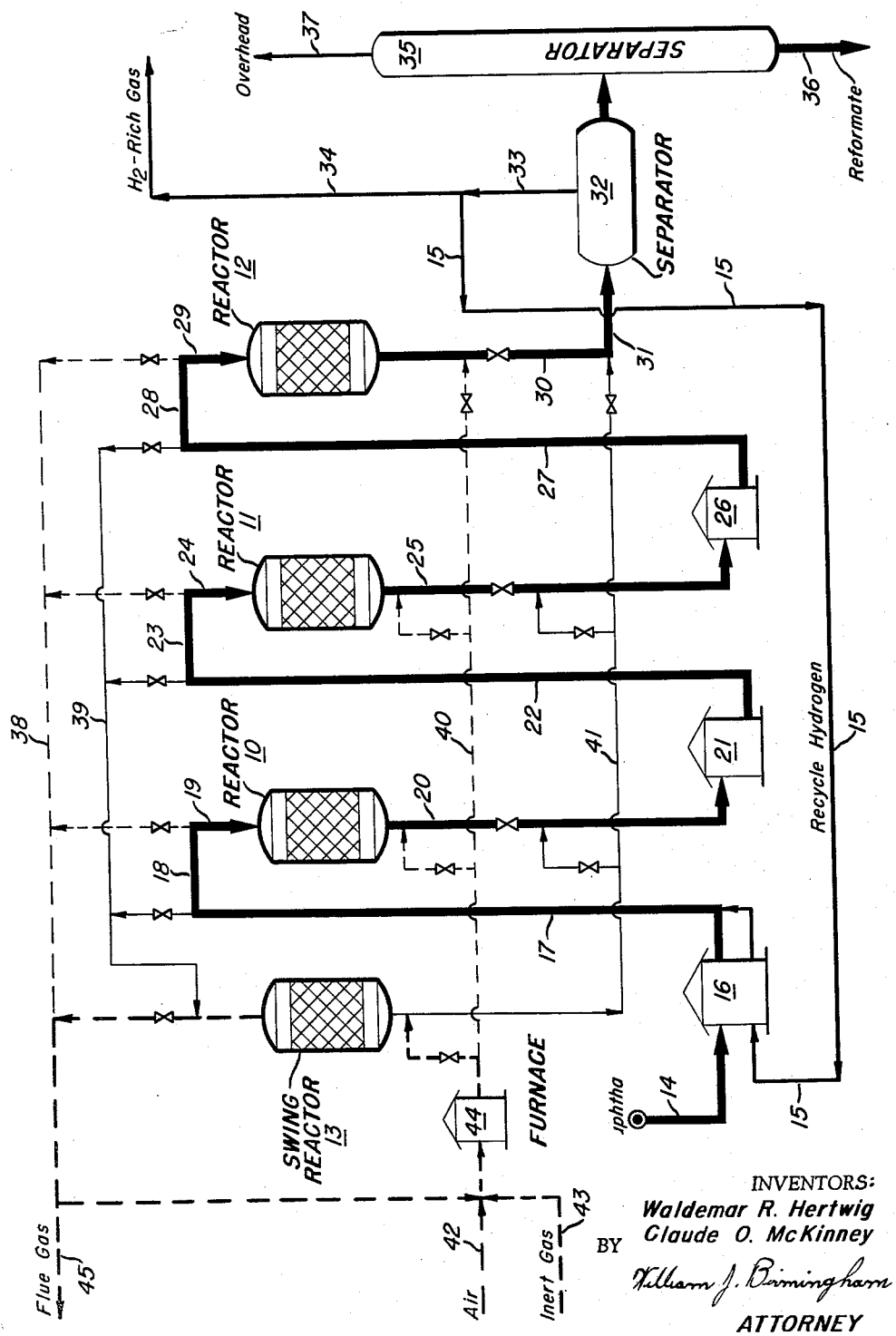

3,117,073
REFORMING PROCESS EMPLOYING PLATINUM-ALUMINA CATALYST
Waldemar R. Hertwig, Highland, and Claude O. McKinney, Whiting, Ind., assignors to Standard Oil Company, Chicago, Ill., a corporation of Indiana
Filed Sept. 30, 1958, Ser. No. 764,408
10 Claims. (Cl. 208—65)

This invention relates to reforming with a platinum-alumina catalyst and, in particular, to reforming with a platinum-alumina catalyst in a series of reaction steps wherein surface area of the catalyst in each stage is controlled so as to enhance reformate yields.

Reforming with a platinum-alumina catalyst now constitutes one of the major petroleum reforming processes, with installed capacity approaching in many instances as much as 20 to 30 percent of total crude runs. With such large volumes of naphthas being processed, even the slightest gain in yields represents substantial savings in material costs. For example, a reformate yield increase of as little as 0.5 percent by volume represents an annual savings of many millions of dollars to the refining industry of the United States. This invention is accordingly directed to a novel method of hydroforming a hydrocarbon naphtha whereby reformate yields are increased.

Platinum-alumina catalysts employed for reforming normally contain an additional acidic component, e.g., halogens such as fluorine or chlorine, silica, and/or the like. Such acidic components promote the various reforming reactions, i.e., dehydrogenation, dehydroaromatization, isomerization, and hydrocracking, and in particular the latter two reactions. While acidic components thus promote activity, too much acidic component adversely effects yields. In fixed-bed reforming units employing a plurality of reaction stages in series, the amount of acidic component that can be advantageously employed without sacrificing yields varies with the particular stage. For example, under certain conditions only up to about 0.6 percent by weight of chlorine in the catalyst can be tolerated in the initial reaction stage where naphthenes are dehydrogenated to aromatics. In the down-stream reaction zones, chlorine contents of as high as 1.0 to 1.2 percent by weight may often be employed advantageously.

Unfortunately, it has been found in actual operations, particularly in relatively "dry" reforming systems, e.g., less than about 100 parts per million (p.p.m.) of water, based on naphtha, that chlorine which may be present in naphtha or recycle gas tends to build up excessively in the first reaction stage where it can least be tolerated from a yield standpoint. At the same time little if any chlorine reaches the downstream reaction zones where it can be used more advantageously. This situation is particularly aggravated in regenerative reforming processes wherein catalyst in downstream reaction zones may be regenerated as much as twice as often, or more, e.g., four to twenty times as often, as catalyst in the first reaction stage. During regeneration, water produced by combustion of hydrocarbonaceous deposits on the catalyst strips chlorine from the catalyst; and thus, substantially more chlorine stripping occurs where chlorine is most needed. Even when chlorine is replaced in the downstream reaction zones some of the replaced chlorine is carried over in recycle gas to the first reaction zone, thereby further aggravating the problem. Consequently, it has sometimes been necessary to reduce chlorine content of the catalyst in the first reaction zone by replacing the catalyst or deliberately scrubbing chlorine from the catalyst, e.g., by chemical washing, by purging with moist gases, or the like. Such expedients are time-consuming, costly, and impose severe limitations on reforming operations. It is an object of the present invention to control chlorine content of platinum-alumina catalyst employed in reforming processes so as to enhance yields without resorting to such extreme expedients. These and other objects of the present invention will become apparent as the detailed description proceeds.

Briefly, in accordance with the present invention, catalyst chlorine levels in the first reaction stage of fixed-bed catalytic hydroforming systems are controlled by limiting surface area of the catalyst to levels of about 130 square meters per gram or less, preferably 90 to 130 square meters per gram, optimally 100 to 120 square meters per gram. At such levels, halogen pickup or retentivity of the platinum-alumina catalyst is lessened, but the catalyst still has sufficient surface area to promote the principal reaction in the first stage, i.e., dehydrogenation of naphthenes. By so limiting surface area and thereby avoiding excessive chlorine levels, excessive hydrocracking of naphthenes and yield losses are avoided. After conversion of naphthenes to aromatics in the first stage, the naphtha is thereafter contacted under reforming conditions in a second stage of two or more reaction zones with a platinum-alumina catalyst having a surface area substantially above about 130 square meters per gram, e.g., 130 to 600 square meters per gram, preferably about 150 to 550 square meters per gram. Chlorine which is not picked up by the catalyst in the first stage may now build up on the catalyst in the second stage to levels in excess of about 0.6 percent by weight, e.g., 0.6 to 1.2 percent by weight, at which levels the chlorine acts as a promoter without incurring excessive yield losses.

By operating with low surface area in the first reaction stage and thereby avoiding excessive chlorine levels, overall reformate yields at any given octane number above about 90 CFR–R, Clear, are increased by as much as about 1 to 3 percent by volume. It is believed that the improved yield associated with the present invention results from the fact that high chlorine in the first reaction stage substantially increases the ratio of cracking to aromatics formation from naphthenes. Aromatics formation is obviously preferred. For paraffin conversion in the second reaction stage, high chlorine increases both the cracking and aromatics formation relatively similarly. Thus, high chlorine in the first reaction stage hurts yield and does little to help activity. In contrast, high chlorine in the second reaction stage is important to high activity and high octanes, and chlorine concentrations as high as about 1 to 1.2 percent by weight may be tolerated without any additional yield penalty. The above theory, however, is presented as one possible explanation of the mechanism of the present invention, but it is not to be considered binding or limiting. Regardless of the mechanism, it has been found that by operating with platinum-alumina surface area of about 90 to 130 square meters per gram in the first reaction stage and higher surface areas in the second reaction stage, improved reformate yields are obtained.

As used herein, "first reaction stage," or simply "first stage," refers to the reaction zone or zones wherein substantially all of the naphthenes in the naphtha charge are converted to aromatics. In similar fashion, "second reaction stage," or simply "second stage," refers to the downstream reaction zones. Thus, where there are three normally-on-stream reaction zones in series, the first stage comprises the first reaction zone, and the second stage comprises the second and third reaction zones. Where the system contains four or more normally-onstream reaction zones, naphthene conversion is sometimes carried out in both the first and second reaction zones. In such cases, the first stage would comprise the first and second reaction zones and the second stage the remaining reaction zones.

The source of the chlorine which builds up on high-surface-area catalyst is believed to be the chlorine in charge naphtha and/or the recycled hydrogen-rich gas. Chlorine in naphtha may be the naturally-occurring chlorine which is often present in crude and/or chlorine introduced during prior processing. The term "chlorine" as used herein includes chlorine in the form of compounds of chlorine, as well as chlorine itself. As applied to catalyst, it includes all chlorine whether chemically or physically bonded. If the naphtha charged to reforming is subjected to prior hydrogenation to minimize, for example, sulfur and/or nitrogen compounds, chlorine content of the naphtha may be substantially reduced, e.g., to less than 0.5 p.p.m. Such low chlorine levels can be tolerated without excessive build up of chlorine in the first reaction stage when substantial water is present in the reaction zone. Water strips chlorine and thus causes it to migrate throughout the various reforming stages. When reforming in the substantial absence of water, e.g., water levels of less than about 100 p.p.m., based on naphtha, even the low chlorine levels associated with hydrogenated naphtha, i.e., hydrofined naphtha, cause excessive chlorine levels in the first reaction stage when high-surface-area catalyst is employed.

In regenerative reforming systems, the problem of excessive chlorine in the first reaction stage may be even more pronounced. Normally, catalysts in the second reaction stage require regeneration far more frequently than in the first reaction stage. In fact, in some installations, only catalyst in the second reaction stage is regenerated. Moisture in regeneration gases strips chlorine. In the second reaction stage this chlorine may be replaced by chlorine addition during on-stream operations and/or regeneration. Unfortunately, a significant portion of this chlorine is carried over to the first reaction stage by recycled hydrogen-rich gas. By limiting surface area in the first reaction stage to the range of 90 to 130 square meters per gram, very little of the chlorine entering the reactor is retained by the catalyst. Surface areas in this range are nonetheless adequate for naphthene conversion, the primary reaction in the first stage. Surface areas above 130 square meters per gram, e.g., 130 to 600 square meters per gram, typically 150 to 550 square meters per gram, are desired in the second reaction stage because higher surface area per se improves activity of the catalyst for the particular reactions occurring in the second stage and because catalysts with such higher surface areas have been found capable of retaining higher chlorine contents, e.g., 0.6 to 1.2 percent by weight.

In the preferred embodiment of the present invention, naphtha is contacted under reforming conditions in the presence of hydrogen-rich recycle gas in a first stage containing less than about 100 p.p.m. of water, based on naphtha, with a first platinum-alumina catalyst having a surface area in the range of about 100 to 120 square meters per gram, whereby chlorine content of the catalyst is maintained not substantially in excess of about 0.6 percent by weight. Effluent from the first reaction stage is thereafter contacted under reforming conditions in the presence of hydrogen-rich recycle gas in a second reaction stage of two or more reaction zones containing less than 100 p.p.m. of water, based on naphtha, with a second platinum-alumina catalyst having a surface area of about 150 to 550 square meters per gram, whereby the chlorine content of the catalyst in the second reaction stage may build up to as high as about 1.0 percent by weight based on catalyst.

Reforming conditions for purposes of the present invention include a temperature in the range of about 800 to 1050° F., a pressure in the range of about 50 to 1000 pounds per square inch gage, a weight-hourly space velocity (based on each reaction stage) in the range of about 0.5 to 20, and a recycled hydrogen-rich gas rate of about 1000 to 10,000 standard cubic feet per barrel of naphtha charged.

The invention will be more clearly understood from the following detailed description read in conjunction with the accompanying figure which forms a part of this specification. This figure shows schematically the Ultraforming process (Petroleum Engineer, vol. XXVI, No. 4, April 1954, at page C-35), in connection with which the present invention is advantageously practiced.

Ultraforming uses an alumina-supported platinum catalyst, in which the platinum content is in the range of about 0.05 to 1 percent by weight. The catalyst is loaded in a series of fixed-bed reactors, usually 3 to 6 in number. A spare or "swing" reactor is usually provided along with suitable manifolding lines and valves so that when catalyst in any of the onstream reactors becomes deactivated, the swing reactor may be temporarily substituted for it. The deactivated catalyst is then regenerated by special techniques which fully restore activity. Typical Ultraforming conditions are temperatures in the range of about 850 to 1000° F., pressure in the range of about 100 to 400 pounds per square inch gage, hourly-weight space velocity (overall) in the range of about 0.5 to 5, and hydrogen recycle rate in the range of about 2000 to 9000 standard cubic feet per barrel of naphtha charge stock.

Catalyst may be prepared by any technique qnown to the art, the particular method of preparaion per se not being part of the present invention. For example, the catalyst may be prepared by co-gelling chloroplatinic acid with a Heard-type alumina hydrosol (Heard Reissue No. 22,196 of October 6, 1942), drying, calcining, lubricating, pelleting, and recalcining. Most catalysts of the prior art when freshly prepared have an alumina surface area in the range of about 150 to 600 square meters per gram. For example, a catalyst prepared as above described may typically have a surface area of about 200 to 250 square meters per gram. As freshly prepared, the catalyst is suitable for loading into the second reaction stage. For the first reaction stage, however, the catalyst must be reduced in surface area to about 130 square meters per gram or less, which reduction in surface area may also be carried out by known methods of the prior art, e.g., by steaming, by heating substantially above above 1100° F., or the like. Alternatively, a used platinum-alumina catalyst which has been subjected to substantial reforming operations and/or regenerations and, as a result, has been reduced in surface area below about 130 square meters per gram may also be employed in the first reaction stage. If the chlorine content of the catalyst to be used in the first reaction stage is above about 0.6 percent by weight, chlorine content can be reduced by methods of the prior art, e.g., steaming.

The Ultraforming system shown in the accompanying figure comprises three normally-onstream reactors 10, 11, and 12 and a swing reactor 13. In such a system reactor 10 comprises the first reaction stage wherein platinum-alumina catalyst having a surface area in the range of about 90 to 130 square meters per gram, e.g., 100 to 120 square meters per gram, is placed. Reactors 11 and 12 comprise the second reaction stage wherein the platinum-alumina catalyst having a surface area in the range of 130 to 600 square meters per gram, e.g., 200 to 300 square meters per gram, is placed. Since swing reactor 13 is substituted for reactors 11 and 12 much more frequently than for reactor 10, it is customary to place the higher-surface-area platinum-alumina in this reactor also.

In the figure, catalyst in swing reactor 13 is being regenerated, while naphtha is being processed in normally-onstream reactors 10, 11, and 12. Accordingly, naphtha feed boiling above about 150° F., e.g., a 180° F. to 360° F. boiling range Mid-Continent naphtha which may contain about 1 to 10 p.p.m. or more of chlorine if not previously hydrodesulfurized, or about 0.1 to 0.5 p.p.m. or more of chlorine if hydrodesulfurized, is passed in line 14 along with recycle hydrogen in line 15 through furnace 16 where they are heated to reaction temperature, e.g., 920° F. Naphtha vapors and recycle gas are then mixed in line 17 and passed via lines 18 and 19 to reactor 10, thence via line 20, reheat furnace 21, and lines 22, 23, and 24 to reactor 11, and finally via line 25, reheat furnace 26, and lines 27, 28, and 29 to tail reactor 12. Reheat furnaces 21 and 26, which along with furnace 16 may be sections of a single large furnace, are required because of the overall endothermic nature of the Ultraforming reactions. This is particularly true in the first reaction stage, i.e., reactor 10 wherein substantially all of the naphthenes are converted to aromatics and the temperature drop may be as much as 75 to 150° F. or more.

As naphtha and recycle gas pass through reactors 10, 11, and 12, most of the chlorine, which is retained by the catalyst, is retained in reactors 11 and 12 wherein chlorine content as high as about 1.0 to 1.2 percent by weight may be employed advantageously. In contrast, because of the low surface area of the catalyst in reactor 10, little if any chlorine in the feed or recycle gas is retained by the catalyst. Even if naphtha and recycle gas contain substantial quantities of chlorine there is no problem with excess chlorine in the second reaction stage, i.e., reactors 11 and 12, because frequent regenerations of these reactors have a depletive effect on chlorine. In contrast, the first reaction stage, i.e., reactor 10, is seldom or never regenerated, and thus there is very little opportunity for stripping of excess chlorine. The problem of excess chlorine is, however, avoided herein by application of the present invention, i.e., employing low surface area catalyst in reactor 10.

Effluent from reactor 12 passes via lines 30 and 31 to separator 32, from which is flashed a hydrogen-rich gas via line 33. A portion of this hydrogen-rich gas is recycled via line 15 to furnace 16. Another portion passes by line 34 as a product, e.g., to plant fuel and/or to other refining operations. Hydrocarbons from separator 32 are passed through a second separator 35, from which product reformate is removed via line 36, and light hydrocarbons are removed overhead via line 37 as another product. Under certain circumstances, it may be desired to remove light ends, e.g., materials boiling below about 180° F., at an intermediate point in the hydroforming chain, e.g., after the first reaction stage, i.e., after reactor 10. This would prevent any further cracking of these light ends in subsequent reactors wherein the chlorine content is substantially higher.

When activity of catalyst in a particular reactor declines, that reactor is temporarily isolated from the naphtha processing system, and its place taken by swing reactor 13, said substitution of reactors being made possible by valved lines 38, 39, 40, and 41. The deactivated catalyst is reactivated using air from source 42, an inert gas from source 43 (usually an inert gas generator), which are heated in furnace 44 and passed via the appropriate manifolding lines to the reactor containing deactivated catalyst, usually reactors 11 and 12. Reactivation may comprise a carbon burnoff and/or additional oxygen treats under controlled conditions. Excess flue gas is removed from the regeneration system via line 45. In the case of reactors 11 and 12, catalyst may be treated before, during, or after the carbon burnoff with free chlorine or free-chlorine-affording compounds, e.g., carbon tetrachloride, at elevated temperatures, e.g., at 800 to 1000° F. After regeneration, the reactor with the regenerated catalyst is again placed back on-stream, and swing reactor 13 may be held in readiness until catalyst in another reactor needs regeneration. Until such time, swing reactor 13 may optionally be operated in parallel with another reactor, e.g., the tail reactor. If in the case of reactors 11 and 12 the catalyst has been treated with chlorine, some of the chlorine will be removed by re-introduction of naphtha and recycle gas and returned to reactor 10 via line 15. Similarly, if chlorine or chlorine-affording compound is added to the naphtha vapors between reactors, a portion of the chlorine may be carried over to the reactor 10, also via line 15. Because reactor 10 contains low-surface-area catalyst with reduced chlorine retentivity, no undesirable build up of the chlorine content of the catalyst in reactor 10 occurs. In like fashion, substantially none of the chlorine introduced with naphtha feed is deposited on the low surface area catalyst in reactor 10. Instead, the chlorine may be deposited on the high-surface-area catalyst in reactors 11 and 12 and/or eliminated from the system along with gas via lines 34 and 37.

As can be seen from the hereinabove described specific embodiment, use of low-surface-area catalyst in the first reaction stage and higher surface area alumina in the second reaction stage results in a chlorine distribution which is optimum for such systems, i.e., low chlorine in the first stage and high chlorine in the second stage. This chlorine distribution enhances yields and contrasts with the chlorine distribution otherwise encountered in substantially-dry hydroforming systems wherein chlorine builds up on the catalyst in the first reaction stage.

The invention will be more fully understood from the following specific example which describes the chlorine distribution obtained before and after application of the present invention to two reforming units employing platinum-alumina catalysts.

*Example*

Prior to applying the method of the present invention, two reforming units were operated for a period of months for the upgrading of a full-boiling-range naphtha of Mid-Continent origin which contained about 1 to 3 p.p.m. of chlorine as charged to the first reactor. Each system contained four reactors plus a fifth swing reactor, the basic flow of each being similar to that described hereinabove in connection with the accompanying figure, except that instead of one intermediate reactor there were two intermediate reactors.

Each reactor contained a platinum-alumina catalyst prepared by co-gelling chloroplatinic acid with a Heard-type alumina hydrosol, drying, calcining, lubricating with Sterotex (a hydrogenated coconut oil), pelleting into 1/8" x 1/8" cylindrical pellets, and again calcining. When placed into each of the reactors, the catalyst contained 0.6 percent by weight of platinum and about 0.6 percent by weight of chlorine and had a surface area of about 235 square meters per gram. After operating for several months for upgrading the above-described naphtha to octanes in excess of 90 CFR–R, Clear, samples of the catalyst from each reactor were removed and analyzed for chlorine content with the following results:

| Reactor | Chlorine Content of Catalyst, percent By Weight | |
|---|---|---|
| | Unit A | Unit B |
| Lead | 1.3 | 0.8 |
| 1st Intermediate | 1.1 | 0.6 |
| 2nd Intermediate | 0.8 | 0.4 |
| Tail | 0.6 | 0.3 |

It is evident from this table that the chlorine distribution is just the opposite of what it should be for enhancing reformate yields.

When catalyst in the lead and first-intermediate reactors is replaced with platinum-alumina catalyst prepared in the same manner but having a surface area of about 100 to 120 square meters per gram, chlorine content in the lead and first-intermediate reactors, after months of operation during which the same naphtha is reformed to substantially the same octane levels, is found to be in the range of about 0.5 to 0.6 percent by weight. In contrast, catalyst in the second-intermediate and tail reactors is found to have a substantially higher chlorine content, averaging about 1.0 percent by weight. As a consequence, reformate yields at the same octane levels are about two percent by volume greater.

While the invention has been described with reference to a specific example and certain specific embodiments, it is to be understood that such embodiments are illustrative only and not by way of limitation. Consequently, additional embodiments included within the scope of the present invention will be apparent from the foregoing description to those skilled in the art.

In accordance with the foregoing description, what is claimed is:

1. A method of hydroforming a hydrocarbon naphtha which comprises contacting said naphtha under reforming conditions in the presence of hydrogen-rich recycle gas and in the substantial absence of water with a first platinum-alumina catalyst having an alumina surface area not in excess of about 130 square meters per gram; subsequently contacting at least a portion of the contacted naphtha under reforming conditions in the presence of hydrogen-rich recycle gas with a second platinum-alumina catalyst having an alumina surface area greater than about 130 square meters per gram; and separating a reformate product.

2. A method of hydroforming a hydrocarbon naphtha which comprises contacting said naphtha under reforming conditions in the presence of recycle hydrogen-rich gas in a first stage containing less than about 100 parts per million of water, based on naphtha, with a first platinum-alumina catalyst having a surface area in the range of about 90 to 130 square meters per gram, whereby chlorine content of said first platinum-alumina catalyst is not substantially raised as the result of pickup of at least a portion of any chlorine in said naphtha and in said recycled hydrogen-rich gas; reheating at least a portion of the effluent product stream from said first stage; contacting the reheated portion of the effluent from said first stage under reforming conditions in the presence of recycled hydrogen-rich gas with at least a second platinum-alumina catalyst having an alumina surface area between about 130 and 600 square meters per gram, whereby the chlorine content of said second platinum-alumina catalyst can be raised as the result of chlorine pickup; and separating a reformate product.

3. In a regenerative hydroforming process wherein naphtha is contacted in the substantial absence of water in at least three normally-onstream reforming zones in series, each of said reforming zones containing a platinum-alumina catalyst, and wherein a spare reaction zone, also containing a platinum-alumina catalyst, is periodically substituted for each of the normally-onstream reaction zones so that catalyst in the replaced normally-onstream reaction zone may undergo regeneration by means of contact with an oxygen-containing gas and wherein catalyst in any of the reaction zones subsequent to the first reaction zone undergoes regeneration at least twice as frequently as catalyst in said first reaction zone, the improvement which comprises contacting the naphtha in said first reaction zone with a platinum-alumina catalyst having a surface area in the range of about 90 to 130 square meters per gram and thereafter contacting the naphtha in subsequent reaction zones with a platinum-alumina catalyst having a surface area in excess of about 130 square meters per gram.

4. A hydrocarbon naphtha hydroforming process which comprises contacting a chlorine-containing hydrocarbon naphtha under reforming conditions in the presence of recycled hydrogen-rich gas in a first stage containing less than about 100 parts per million of water, based on naphtha, with a first platinum-alumina catalyst having an alumina surface area in the range of about 90 to 130 square meters per gram; reheating the effluent naphtha from said first stage; thereafter contacting the naphtha under reforming conditions in the presence of recycled hydrogen-rich gas in a second stage with at least a second platinum-alumina catalyst having an alumina surface area substantially above about 130 square meters per gram; and separating a reformate product, whereby the chlorine content of the catalyst in said first stage is maintained not substantially in excess of 0.6 percent by weight and the chlorine content of the catalyst in said second stage is maintained above about 0.6 percent by weight.

5. The method of claim 4 wherein said first stage comprises at least one reaction zone and said second stage comprises at least two reaction zones in series with reheat zones between each reaction zone.

6. In multistage hydroforming wherein naphtha is contacted under hydroforming conditions with a platinum-alumina catalyst in the presence of hydrogen-rich recycle gas in a first reaction stage and in subsequent reaction stages the improvement comprising a hydroforming process wherein a platinum-alumina halogen-containing hydroforming catalyst of low surface area is used in a first reaction stage to maintain the halogen content of said catalyst at a low level which avoids excessive hydrocracking of naphthenes and promotes the yield of aromatic hydrocarbons in said first reaction stage.

7. A method of hydroforming a hydrocarbon naphtha which comprises contacting said naphtha under reforming conditions in the presence of a recycled hydrogen-rich gas in a first reaction stage containing less than 100 p.p.m. of water, based on naphtha, with a first platinum-alumina catalyst having a surface area in the range of 90–130 square meters per gram; maintaining the chlorine concentration of the catalyst in said first reaction stage at a level substantially the same as that of the fresh catalyst, whereby the yield of aromatic hydrocarbons in the effluent from said first reaction stage is increased; reheating at least a portion of the aromatic enriched effluent product from said first reaction stage; contacting such reheated portion of the effluent under reforming conditions with a platinum-alumina catalyst in the presence of a recycled hydrogen-rich gas in at least one additional reaction stage, the platinum-alumina catalyst in said additional stage having an alumina surface area of between about 130–600 square meters per gram; and maintaining halogen concentration in said additional stage at a level substantially in excess of that maintained in said first reaction stage whereby the reformed naphtha yield is increased by reason of maintaining said higher halogen content.

8. In hydroforming wherein naphtha is contacted with a platinum-alumina catalyst in a first reaction stage under reforming conditions in the presence of hydrogen-rich recycle gas and in the substantial absence of water, and subsequently, at least a portion of the contacted naphtha is contacted in a second reaction stage under reforming conditions in the presence of hydrogen-rich recycle gas with a platinum-alumina catalyst the improvement comprising using in said first reaction stage a platinum-alumina catalyst having an alumina surface area not in excess of about 130 square meters per gram, and using in said second reaction stage a platinum-alumina catalyst having an alumina surface area greater than about 130 square meters per gram.

9. A method of hydroforming a hydrocarbon naphtha which comprises contacting said naphtha under reforming conditions in the presence of hydrogen-rich recycle gas and in the substantial absence of water with a first platinum-alumina catalyst having an alumina surface area of about 100 to 120 square meters per gram; subsequently contacting at least a portion of the contacted naphtha under reforming conditions in the presence of hydrogen-rich recycle gas with a second platinum-alumina catalyst having an alumina surface greater than about 150 square meters per gram, and separating a reformate product.

10. A method of hydroforming a hydrocarbon naphtha which comprises contacting said naphtha under reforming conditions in the presence of hydrogen-rich recycle gas with a first platinum-alumina catalyst having an alumina surface area of about 90 to 120 square meters per gram; subsequently contacting at least a portion of the contacted naphtha under reforming conditions in the presence of hydrogen-rich recycle gas with a second platinum-alumina catalyst having an alumina surface greater than the maximum surface area of said first catalyst, and separating a reformate product.

References Cited in the file of this patent

UNITED STATES PATENTS

| | | |
|---|---|---|
| 2,863,822 | Sage | Dec. 9, 1958 |
| 2,885,345 | Hemminger et al. | May 5, 1959 |
| 2,893,837 | Kearby et al. | July 7, 1959 |
| 2,902,426 | Heinemann et al. | Sept. 1, 1959 |

OTHER REFERENCES

"Advances in Catalysis," vol. VI, 1954, page 382, Academic Press Inc., New York.